United States Patent [19]
Dadd

[11] Patent Number: 6,127,750
[45] Date of Patent: Oct. 3, 2000

[54] LINEAR COMPRESSOR MOTOR

[75] Inventor: Michael William Dadd, Cowley, United Kingdom

[73] Assignee: Isis Innovation Limited, Oxford, United Kingdom

[21] Appl. No.: 09/214,345

[22] PCT Filed: Jul. 8, 1997

[86] PCT No.: PCT/GB97/01823

§ 371 Date: Jun. 28, 1999

§ 102(e) Date: Jun. 28, 1999

[87] PCT Pub. No.: WO98/01674

PCT Pub. Date: Jan. 15, 1998

[30]    Foreign Application Priority Data

Jul. 8, 1996 [GB] United Kingdom ............... 9614304

[51] Int. Cl.[7] .................. H02K 41/00; H02K 33/00; F04B 17/04
[52] U.S. Cl. ............. 310/13; 310/27; 417/417
[58] Field of Search .................. 310/12, 13, 14, 310/15, 20, 27, 28, 36; 417/410.1–410.5, 416, 417, 418, 419, 423.14, 423.15; 318/119, 135, 686, 687; 335/255

[56]         References Cited

U.S. PATENT DOCUMENTS

| | | | |
|---|---|---|---|
| 2,003,647 | 6/1935 | Dillstrom | 310/14 |
| 2,675,533 | 4/1954 | Brown | 310/15 |
| 3,103,603 | 9/1963 | Reutter | 310/15 |
| 3,119,940 | 1/1964 | Pettit et al. | 310/24 |
| 3,581,132 | 5/1971 | Laing | 310/166 |
| 4,040,445 | 8/1977 | McCormick | 137/596.18 |
| 4,053,975 | 10/1977 | Olbrich et al. | 29/596 |
| 4,127,835 | 11/1978 | Knutson | 335/266 |
| 4,394,592 | 7/1983 | Pataki | 310/12 |
| 5,395,218 | 3/1995 | Thompson | 417/416 |

FOREIGN PATENT DOCUMENTS

| | | |
|---|---|---|
| 0479443 | 4/1992 | European Pat. Off. . |
| 1349805 | 4/1964 | France . |
| 2428376 | 1/1975 | Germany . |
| 2915199 | 8/1980 | Germany . |
| 4129018 | 3/1993 | Germany . |
| 2062773 | 5/1981 | United Kingdom . |
| WO9012961 | 11/1990 | WIPO . |

*Primary Examiner*—Elvin Enad
*Assistant Examiner*—Dang Dinh Le
*Attorney, Agent, or Firm*—Volpe and Koenig, P.C.

[57]         ABSTRACT

A linear compressor motor comprising a piston assembly (2) and a cylinder assembly (3) mounted together for relative axial movement along an axis (1) by a pair of spiral springs (16, 17). The piston assembly (2) includes a piston (6) and the cylinder assembly (3) including a cylinder (4), there being a low clearance between the cylinder and the piston to enable a pumping action to be achieved without seals. Mounted on the exterior of the cylinder (4) is a magnet (13) and associated polepiece (14). Forming part of the cylinder assembly (3) is a cylindrical housing (11) in which the cylinder itself is mounted by means of a radially-extending flange (12). The coil for interaction with the magnet is positioned in an annular air gap between the polepiece (14) and the housing (II). The coil is wound on a coil holder (8) which is itself mounted on the piston (6) by way of a radially-extending flange (7). The other radial end of the coil holder (8) is formed with radially extending wings (26) which mount a cylindrical hub (25) which is a clearance fit on the cylinder (4). The end of the coil holder (8) is castellated to pass across the flange (12), through suitable apertures (20) in flange (12). An AC current is applied to the coil to cause relative reciprocatory motion between the piston and cylinder to achieve a pumping action.

25 Claims, 11 Drawing Sheets

LINEAR COMPRESSOR MOTOR

This application claims priority from PCT Application No. PCT/GB97/01823, filed on Jul. 8, 1997, which claims priority from British Application No. 9614304.5, filed Jul. 8, 1996.

This invention relates to linear compressor motors.

Conventional electrically-driven compressors typically comprise an electric motor which drives a reciprocating piston/cylinder assembly via a crankshaft or equivalent cam arrangement. Recently, interest has been shown in linear compressors since these can be made very compact and have very long life with negligible wear and are thus suited to specialised applications, for example in refrigeration.

Figure 1:
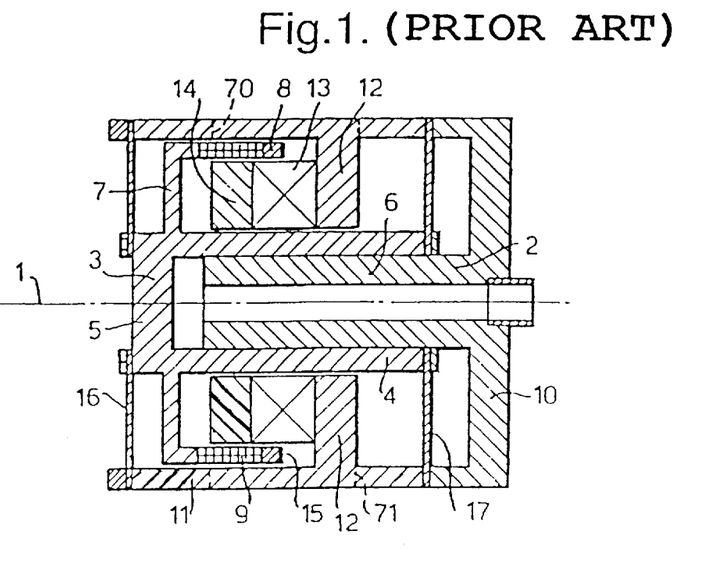
FIG. 1 is a side sectional view of a known construction of linear compressor motor.

A known type of moving coil linear compressor motor is illustrated in FIG. 1 of the accompanying drawings, to which reference is now directed.

The motor comprises two assemblies which are movable in relation to one another along an axis 1. The two assemblies are a cylinder assembly 3 and a piston assembly 2. The assembly 3 comprises a cylinder 4, closed at one end 5, and in which reciprocates a piston 6 forming part of the assembly 2. The radial clearance between the piston and cylinder is typically in the range 5–15 μm and this ensures that the reciprocating motion of the cylinder relative to the piston provides an effective pumping action.

Extending radially outwardly from the cylinder 4 is a flange 7. At its outer perimeter edge, the flange turns and has mounted thereon a cylindrical coil holder 8 made of non-magnetic material. The coil holder 8 is thus fixed to and coaxial with the cylinder 4, but spaced outwardly therefrom. Wound on the coil holder 8 is a multi-turn coil 9 of wire, the ends of which are connected to a suitable alternating supply to provide the necessary oscillatory motion.

The piston 6 is mounted on a round end cap 10 which is attached by means of axial bolts (not shown) to a cylindrical housing 11. Extending radially inwardly from the housing 11 is a flange 12 on which is mounted an annular magnet 13 and annular inner pole piece 14. The housing 11 and flange 12 are made, at least in part, of magnetic material, thus forming a magnetic circuit which also includes the magnet itself and the inner pole piece 14. It will be seen that, situated in the magnetic circuit, is a cylindrical air gap 15 formed between the inner pole piece 14 and the housing 11, which latter thus constitutes an outer pole piece.

In practice the housing 11 is split in the axial direction into three distinct components: separated at dotted lines 70,71. The central component is made of magnetic material, as required by the magnetic circuit and includes the outer pole piece. On the left side (adjacent to the air gap) there is a requirement for the material to be nonmagnetic in order to minimise flux leakage and a separate spacer is used (typically of aluminum alloy). On the right side there is no particular requirement and either the outer magnetic circuit can be extended or a separate component can be used.

Figure 2:
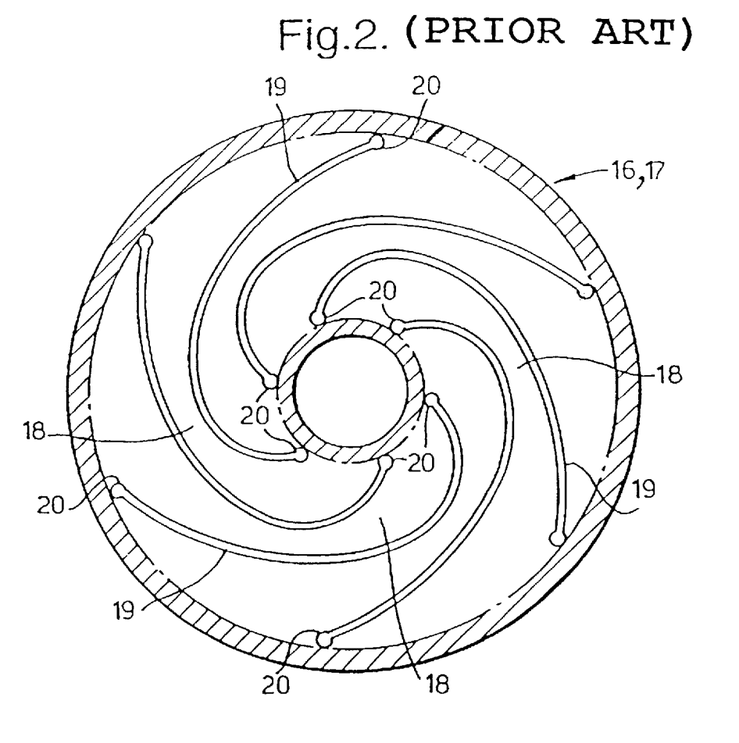
FIG. 2 is a plan view of a known type of spiral spring used in the compressor motor of FIG. 1.

The assemblies 2 and 3 are mounted together for relative axial movement by means of a pair of spiral springs 16,17. Each of these springs is made from one or more round flat discs of thin material, such as stainless steel or beryllium copper, typically 0.1–1 mm thick. A plan view of a single such disc is shown in FIG. 2 of the accompanying drawings, in which the shaded areas indicate where the spring is clamped to adjacent components: the inner area to the cylinder/coil holder assembly 3 and the outer area to the piston/magnet assembly 2. Between the areas a series of six spiral arms 18 are created by forming slots 19 in the disc. Each slot opens at each end into a hole 20 in order to provide stress relief. In the event that each spring comprises more than one disc, individual discs are separated, in the axial direction, by means of thin shims (not shown).

The stiffness of these springs in the direction of axis 1 is quite low, whereas the radial stiffness is very high. Thus the two springs 16 and 17 constrain the assemblies 2,3 to move accurately with respect to one another along the axis 1 and enable the above-mentioned fine tolerances to be achieved between the piston 6 and cylinder 4 which in turn means that no contacting seals are necessary between the two.

The motor is activated by applying a suitable ac supply to the coil 9, usually via the spiral springs 16,17 which are suitably insulated from other components. Thus the coil, due to the electromagnetic interaction between itself and the magnetic field across the gap 15, experiences an oscillatory force which causes it to execute an oscillatory motion with respect to the piston/magnet assembly 2, which motion is constrained in the manner described above by the action of the springs 16 and 17 to be backwards and forwards along the axis 1. This causes the piston 6 to reciprocate within the cylinder 4 to provide the necessary pumping action.

The present invention is concerned with compressor motors of the above-described type and seeks to provide a construction which is potentially more compact than that described above. This is achieved by making the coil assembly into a structural member. In the above-described motor, the coil assembly is supported at one end and its role is purely to generate a force. In the motor of the present invention, the coil assembly has the additional role of structural member.

In accordance with the invention, there is provided a linear compressor motor comprising a cylinder assembly and a piston assembly, mounting means for mounting said cylinder assembly to said piston assembly for limited movement along an axis, magnet means mounted on one of said assemblies and defining an air gap, a coil assembly mounted on the other of said assemblies and including a coil mounted for axial movement in said air gap, the motor being characterised in that said other of said assemblies comprises a first part and a second part joined by said coil assembly, in that said mounting means comprises two axially-spaced connecting elements, a first element connecting said first part of said other of said assemblies to said one of said assemblies and a second element connecting said second part of said other of said assemblies to said one of said assemblies.

The coil assembly thus acts as a structural element joining together the first and second parts of said other assembly; the crucial support between the two assemblies, achieved by the two spaced connecting elements, is, in the case of said other assembly, effectively across the coil assembly. Although not essential, it happens that in all of the embodiments to be described, said one assembly (which carries the magnet means) is the cylinder assembly and said other assembly (which carries the coil assembly) is the piston assembly.

The coil assembly is normally constituted by the coil itself, and its holder, but there is no reason why a self-supporting coil, without a holder, could not act in this capacity. The coil holder is preferably of generally cylindrical shape and the coil is wound in a recess in its outer peripheral surface. Alternatively, the coil may be wound in a through-slot, which through-slot effectively divides the coil holder into two parts, spaced apart axially by the width of the slot. These two parts are physically joined by the coil itself. In this case the coil itself would have to be self-supporting and, for this purpose, a suitable potting agent could be used to bind the coil turns together as a single unit. The coil may also be reinforced by thin layers of non-magnetic material placed between adjacent layers of the coil winding. Such a material could for example be a sheet of plastics material or a woven or non-woven fabric material. Specific examples include kevlar or carbon fibre.

The magnet means forms part of a complete magnetic circuit comprising a magnet, and the aforesaid air gap which is defined between pole pieces. There may be just a single magnet, as in the prior art motor of FIG. 1, but a greater magnetic field strength across the air gap can be achieved by a pair of magnets with little or no increase in size (particularly diameter—usually the critical dimension) of the overall motor. The magnet or magnets are preferably permanent magnets, but may be electro-magnets. Conveniently the or each magnet is annular in shape and is mounted about the axis of the motor. The magnets may be radially or axially magnetised, depending upon the particular construction. In most of the described embodiments, the magnet/magnets are axially magnetised since such embodiments tend to be easier to construct. Where there are a pair of magnets supplying flux to said air gap, the magnets are axially spaced apart with a common pole piece in between and are axially magnetised in mutually opposite directions.

The connecting elements which act to mount the two assemblies with respect to one another are preferably such as to constrain the assemblies to relative axial movement along the axis. The spiral springs described above in relation to FIG. 2 are suitable for this purpose but we have designed an alternative spring of similar concept but of more compact design and which produces more even stressing of the arms. This alternative design will be described below.

In order that the invention may be better understood, several embodiments thereof will now be described by way of example only and with reference to the accompanying drawings in which:

FIG. 21 is a view on the lines 21—21 of FIG. 22; FIG. 22 is a view on the lines 22—22 of FIG. 21;

Figure 3:
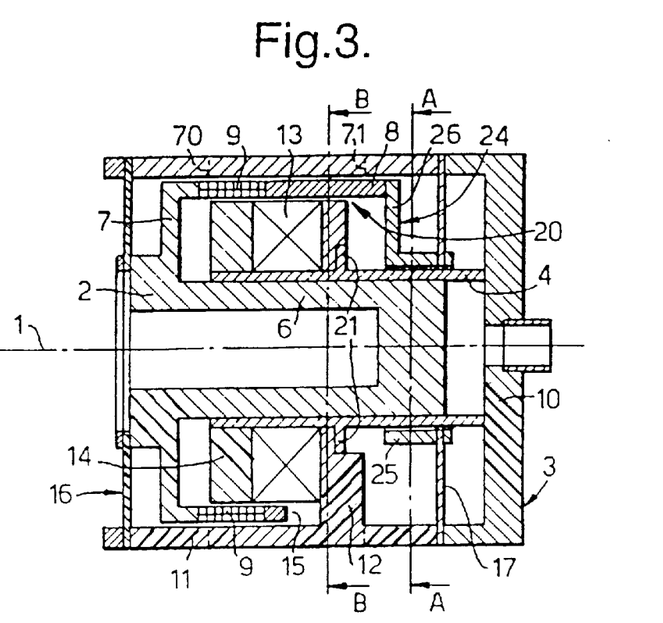
FIG. 3 is a side sectional view of a first embodiment of a linear compressor motor constructed in accordance with the present invention.
Figure 4:
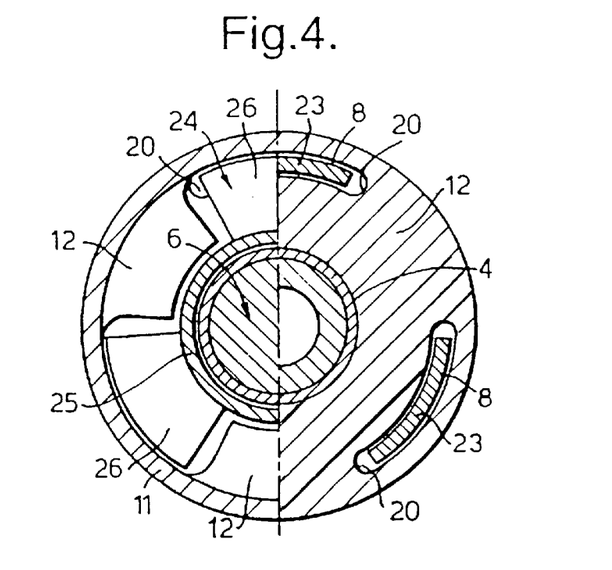
FIG. 4 is a two-part sectional view of the linear compressor motor shown in FIG. 3: the left hand part is a section on the lines A—A of FIG. 3 and the right hand part is a section on the lines B—B of FIG. 3.

In the following description the same reference numerals as are present in FIGS. 1 and 2 are used where appropriate. Referring firstly to FIGS. 3 and 4, there is shown a first embodiment of the invention. The differences over the arrangement of FIG. 1 will be detailed below.

In the embodiment of FIG. 3, the outer housing 11 and end cap 10 form part of the cylinder assembly 3, instead of the piston assembly, as in FIG. 1. Likewise, the permanent magnet 13 and inner pole piece 14, attached via flange 12 to the housing 11, are also part of the cylinder assembly 3. Formed in the flange 12 are three slots 20, spaced apart by 120°, in which moves a castellated section of the coil holder 8, as will be explained.

The cylinder 4 may be fixed at its right-hand end where it abuts the inside surface of the end cap 10, but the main fixing point is by way of a flange 21 which extends outwardly from the outer surface of the cylinder and is attached by any convenient means to the flange 12.

Figure 21:
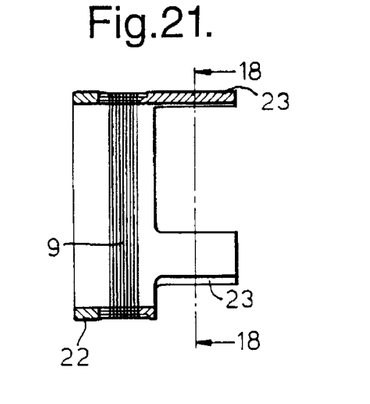
FIGS. 21 and 22 are side sectional and end sectional views respectively of one embodiment of coil assembly used in the embodiment of FIG. 3.
Figure 22:
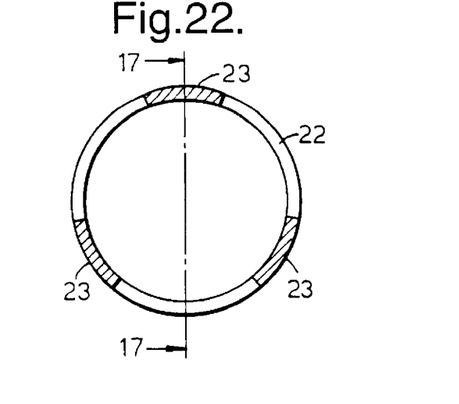
Figure 23:
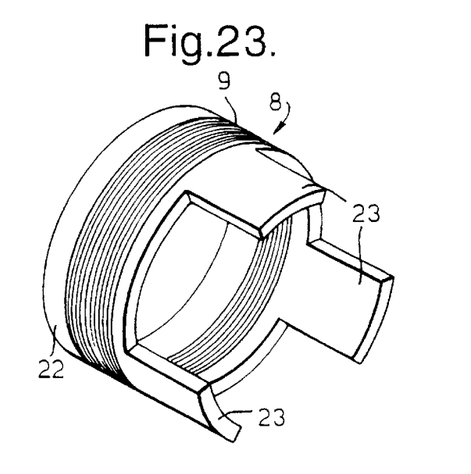
FIG. 23 is a perspective view of the coil assembly of FIGS. 21 and 22.

The piston assembly 2 carries the flange 7 which is affixed, at its outer end, to the coil holder 8. The coil holder 8 is shaped as shown in FIGS. 21 to 23, namely with a plain cylindrical section 22 and a castellated section comprising three castellations 23 spaced apart by 120°. The coil holder 8 is made of non-magnetic material, such as aluminum, stainless steel or titanium alloy. Suitably positioned gaps may be incorporated, if necessary to reduce eddy currents. The coil holder may alternatively be made of a non-conductive material, for example a rigid plastics material such as PEEK or a composite material such as GRP.

The left-hand end of the plain cylindrical section 22 of the coil holder, when seen in FIG. 23, is attached to the flange 7, as described above. Each castellation passes through, with clearance, a respective slot 20 in the flange 12 and is attached at its end to a spider member 24. The spider member 24 comprises a cylindrical hub 25 which is a clearance fit on the cylinder 4, from which emerge three radially-extending wings 26 spaced apart by 120°. At its end, each wing 26 attaches to the end of a respective castellation 23, thus making the spider member a part of the piston assembly 2.

Figure 30:
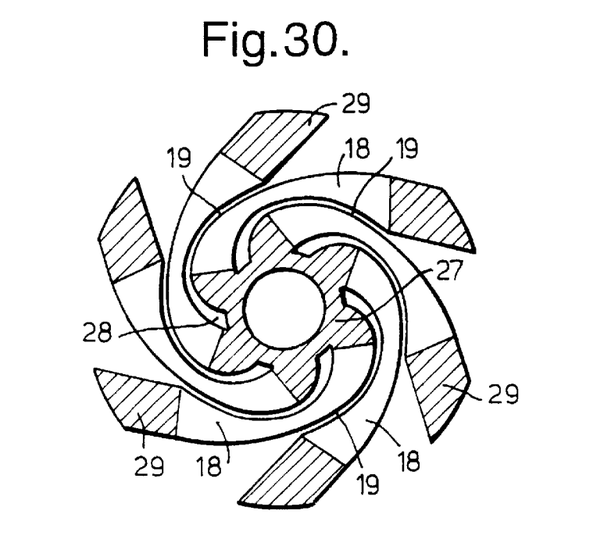
FIG. 30 is a plan view of an alternative type of spiral spring for use in the embodiments of the present invention.

The piston assembly 2 is mounted with respect to the cylinder assembly 3 by means of a pair of spiral springs 16,17 such as described above with reference to FIGS. 1 and 2. An alternative disc design for the springs is shown in FIG. 30; the principal differences over the design of FIG. 2 are as follows:

1) On the I.D. the annular clamp ring has been replaced by a "toothed" clamp ring 27 that matches the end profile of the spring arm 18. The circular stress relief holes now become an opening of the slot 19 into a "teardrop" shape 28.

2) On the O.D. the spring arms 18 have been split. The annular clamp ring has been replaced by individual clamps 29 for each arm, their shaping again being matched to the end profile of the spring arm. The splits eliminate the need for stress relief holes.

The net effect of these changes is to allow a much more compact spring design. It has also been found that the geometry produces more even stressing of the arms 18 which again improves its performance over the conventional design. The main disadvantage of the new design is that the spring clamps are significantly more complicated to manufacture. It is to be noted that the modifications to the inner and outer clamps are independent and so hybrid designs are possible.

The magnetic circuit in the embodiment of FIG. 3 thus comprises the magnet 13, flange 12 (which, like the central component of housing 11 is of magnetic material), the central component of housing 11 (which, as before, forms an outer pole piece), and the inner pole piece 14. A strong magnetic flux is thus present in the gap 15 between the inner and outer pole pieces.

The piston assembly including the piston itself, flange 7 and spider member 24 are preferably made from non-magnetic material, for example aluminum alloy, stainless steel, rigid plastics material or a composite material. The magnetic circuit components, other than the magnet itself, are preferably made of soft magnet material having the following properties:
 (i) High saturation flux
 (ii) Low remanence
 (iii) High permeability
Typical materials are soft iron and cobalt iron.

Figure 5:
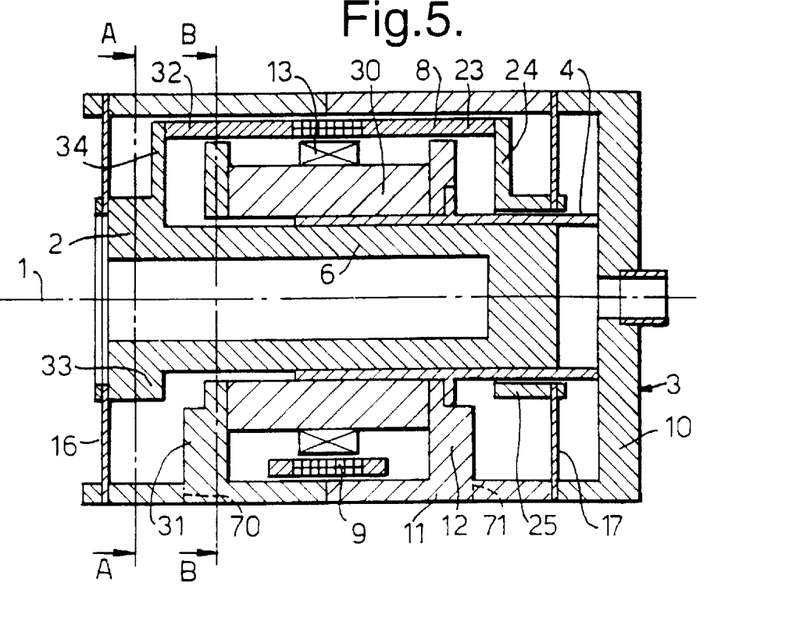
FIGS. 5, 7, 9, 11, 13, 15 and 17 are views similar to FIG. 3 but showing further embodiments of the invention.
Figure 6:
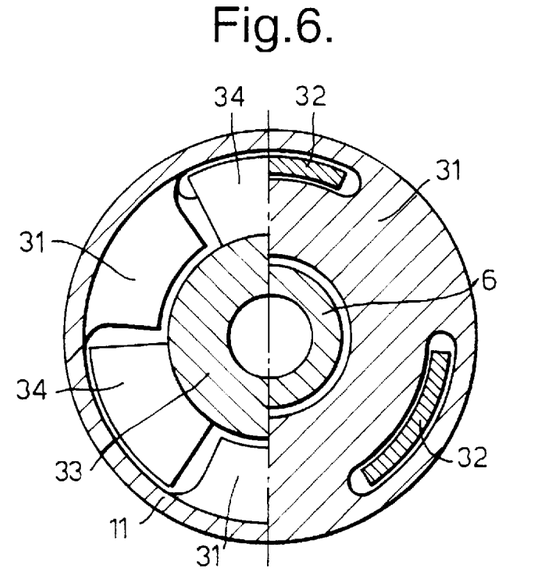
FIGS. 6, 8, 10, 12, 14 and 16 are views similar to FIG. 4 but showing sections of FIGS. 5, 7, 9 and 11 respectively.

In the design illustrated in FIG. 1, the magnet 13 is magnetised in the direction of axis 1. In the embodiment of FIGS. 5 and 6, the magnet 13, although still of toroidal shape, is magnetised in the radial direction.

Figure 24:
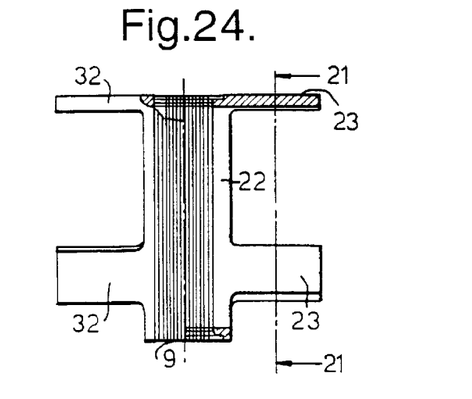
FIGS. 24, 25 and 26 correspond to FIGS. 21, 22 and 23 respectively, but show a second embodiment of coil assembly for use in the embodiments of FIGS. 5, 7, 9, 11, 13, 15 and 17.
Figure 25:
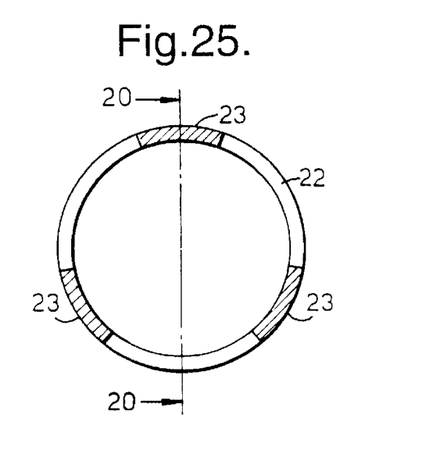
Figure 26:
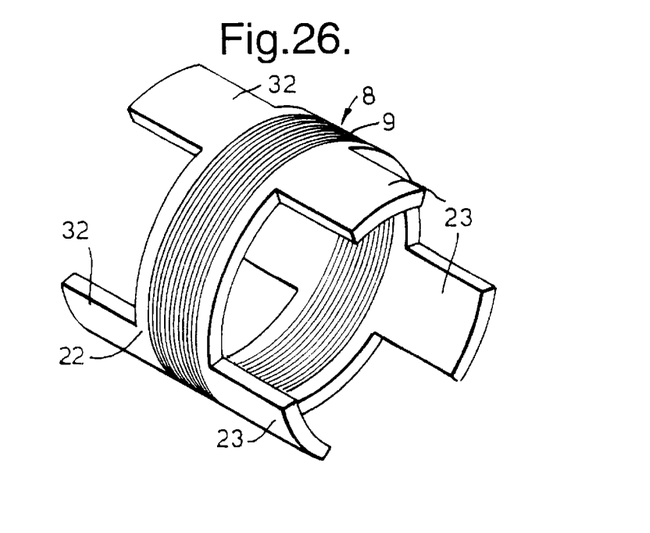

The physical construction is very similar to that of FIG. 3. The main difference is that the magnet and inner pole piece assembly 13/14 of FIG. 3 is replaced by an axially extending core member 30 of magnetic material which is fitted between the flange 12 and a further flange 31 extending, like flange 12, inwardly from the inner surface of housing 11. For ease of assembly, the housing 11 may be in two parts, as shown. The slots 20 in the flange 12 are mirrored in the flange 31, each slot in the flange 31 being in registry with a corresponding slot in flange 12. The coil holder 8 is constructed in the manner illustrated in FIGS. 24 to 26. In this version, the coil holder has a central plain cylindrical section 22, and castellated end sections formed by three castellations 23, spaced apart by 120°, at one end, and a further three castellations 32, also spaced apart by 120°, at the other. Thus, when assembled, the castellations 23 pass through respective slots 20 in flange 12 and castellations 32 pass through respective slots in flange 31. In addition, the flange 7 takes a similar form to the spider member 24; in other words with a central hub 33 from which protrude three radially outwardly extending wings 34, spaced apart by 120°, which are each attached to a respective castellation 32. The magnetic circuit thus comprises twin paths: half of the flux of magnet 13 goes round via core member 30, flange 12 and the central component of housing 11 which latter forms, as before, an outer pole piece; the other half of the flux goes round via core member 30, flange 31 and the central component of housing 11. The magnet 13 of this embodiment can also be split into two axially-spaced components in the manner of the embodiment of FIG. 7, described below.

Figure 7:
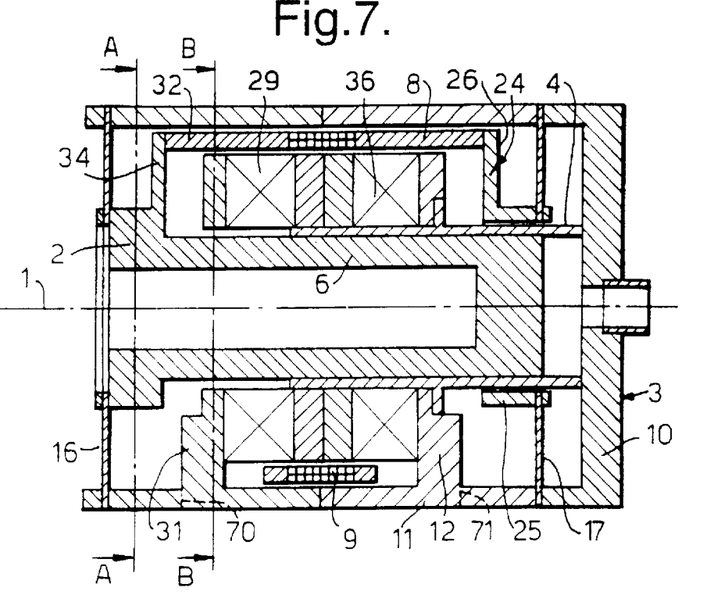
Figure 8:
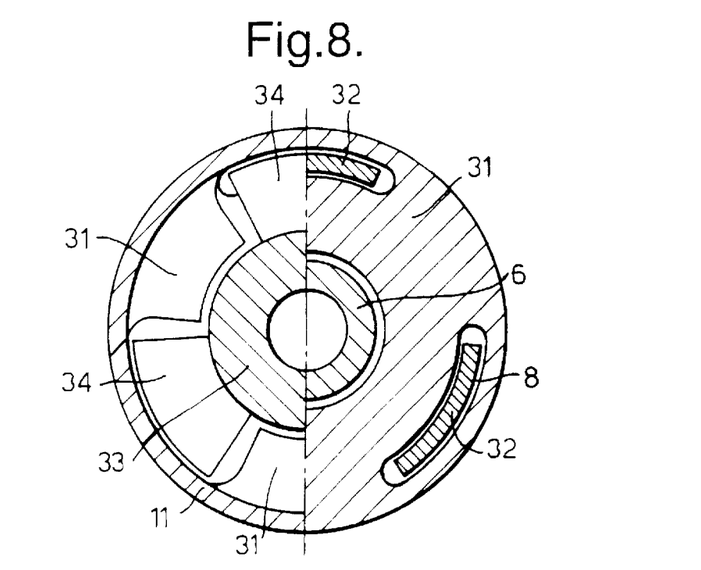

FIGS. 7 and 8 show a further embodiment, similar to that of FIG. 5, but using a pair of axially-magnetised annular magnets 29,35 to provide an increased magnetic flux in the air gap 15. In this case, mounted between the flanges 12 and 31 are the aforesaid two magnets which are spaced apart along axis 1 and have in between an annular pole piece 36 which for ease of assembly is made in two parts, as shown. The magnets are magnetised in opposite directions so that like poles face one another across the inner pole piece 36. It will be seen that there is thus a twin magnetic circuit:
 (i) magnet 29—flange 31—central component of housing 11 and pole piece 36;
 (ii) magnet 35—flange 12—central component of housing 11 and pole piece 36.

Since the housing 11 (forming the outer pole piece) and the inner pole piece 36 are common to both circuits, the air gap between them receives the flux from both magnets and the force applied to the coil holder 8 for a given level of current applied to the coil 9 is that much greater. Also, the closed magnetic circuit which results from this construction leads to a very low level of stray flux.

FIGS. 9 to 16 show four different compressor designs incorporating the motor illustrated in FIGS. 7 and 8.

Figure 9:
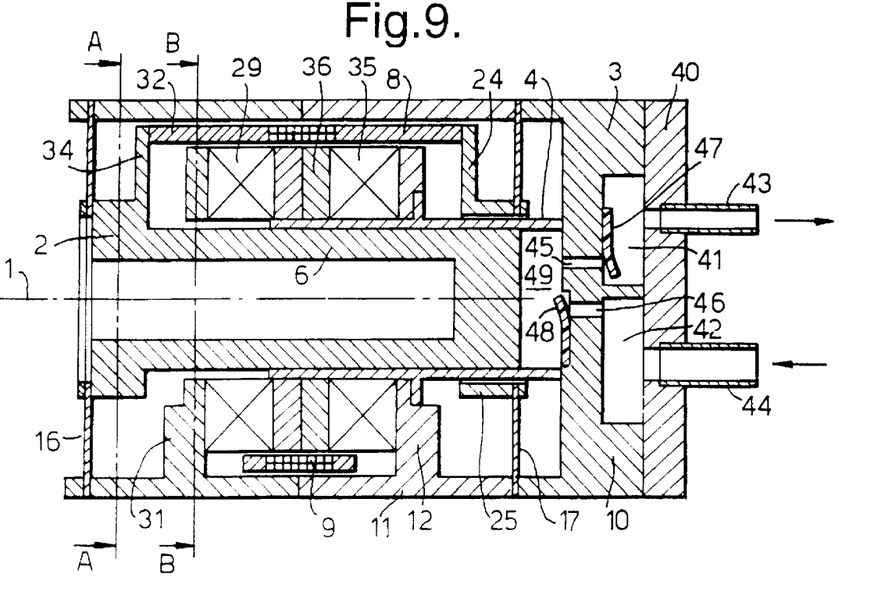
Figure 10:
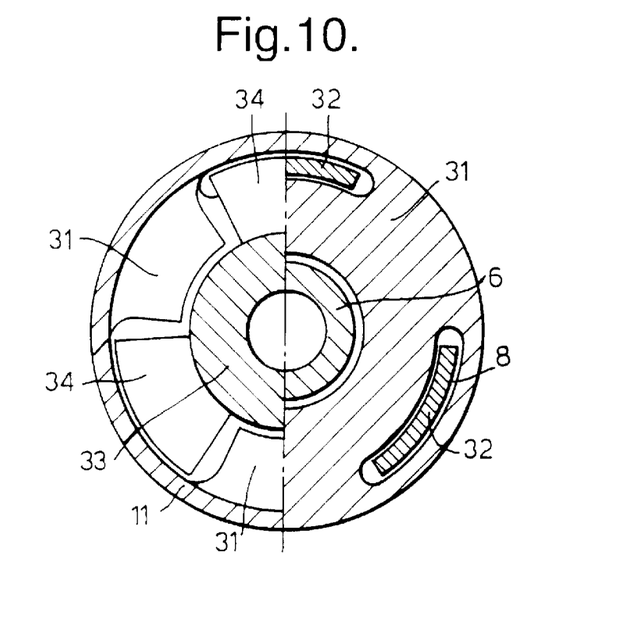

In the embodiment of FIGS. 9 and 10, the end cap 10 is shaped to form, with a closure member 40, two separate chambers 41,42. The chamber 41 connects to a gas outlet orifice 43 and the chamber 42 connects to a gas inlet orifice 44. Respective passages 45,46 are formed from the chambers 41,42 into the interior 49 of the cylinder 4. One-way valves 47,48 control the flow of gas along the passages 45 and 46 respectively. The valves 47,48 are, for example, flap valves of hard stainless steel or polymer.

The method of operation will be clear to those skilled in the art. As the piston 6 moves from right to left within the cylinder 4, gas is drawn in through orifice 44 via chamber 42 and passage 46 into the space within the interior 49 of the cylinder left by the moving piston. During this period the flap valve 48 is open and the flap valve 47 is closed. As the piston 6 moves from left to right, gas is expelled from the interior 49 of the cylinder, through the passage 45 and chamber 41 to the outlet orifice 43. The close fit between the piston and cylinder (actually about 10 μm radial clearance) ensures that an effective pumping action is achieved without the need for piston rings or seals and this in turn reduces wear between the relatively moving parts to almost negligible proportions.

Figure 11:
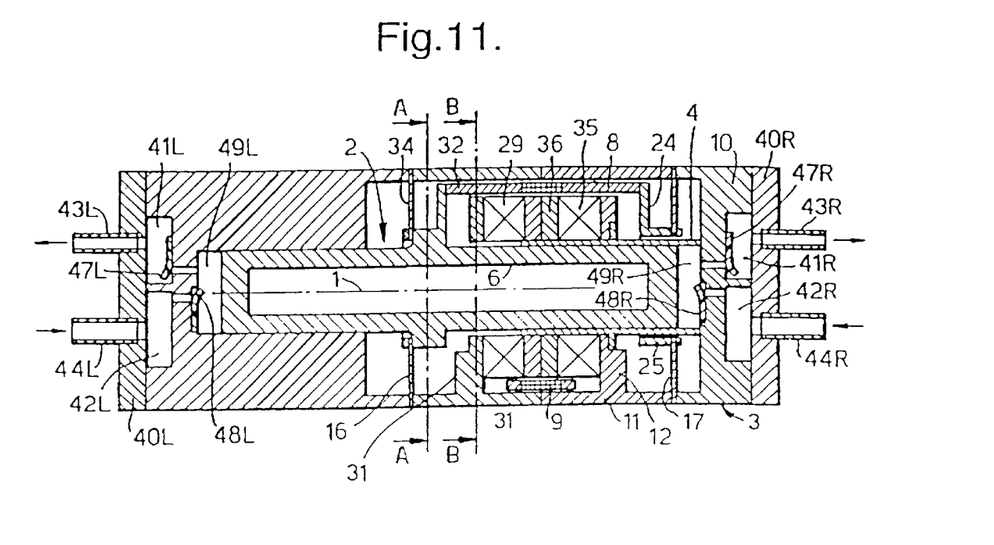
Figure 12:
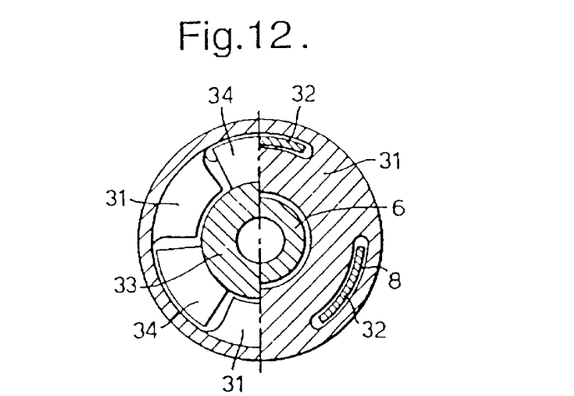

The compressor shown in FIGS. 11 and 12 is a doubled-ended version of the embodiment of FIGS. 9/10. The corresponding gas flow components from FIGS. 9/10 are indicated by the extra letter L or R to indicate left or right. The left and right stages can be connected in series or in parallel, or they can be connected independently of one another. If they are connected in series, the unit becomes a two-stage compressor; if they are connected in parallel, the unit essentially becomes a double acting single-stage compressor.

Figure 13:
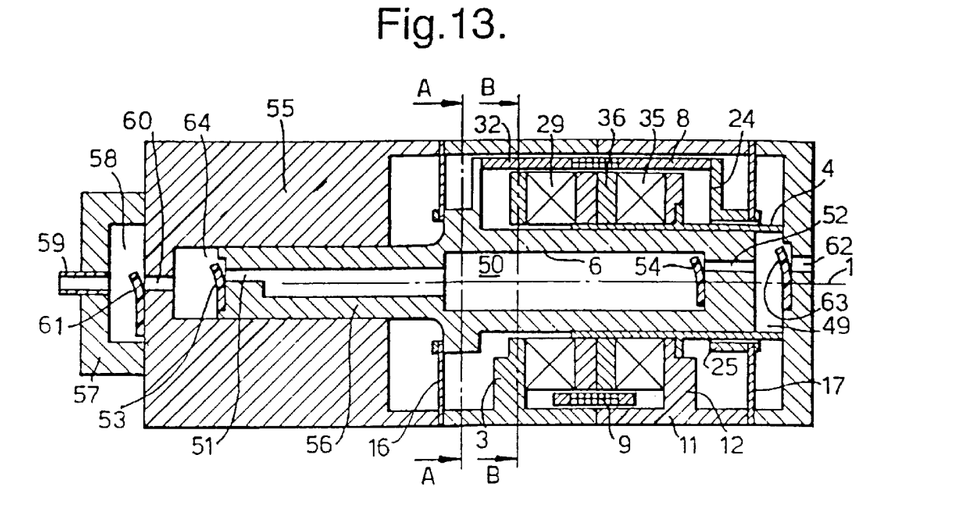
Figure 14:
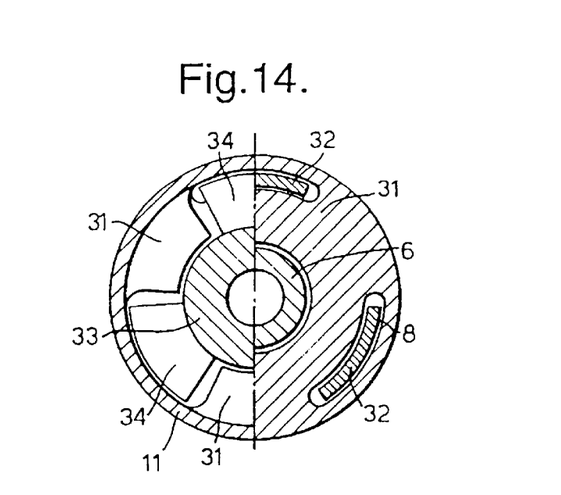

The compressor shown in FIGS. 13 and 14 is a two-stage type in which intermediate valves and buffer volume are integrated into the piston assembly. In the compressor of FIGS. 13 and 14, the piston 6 is modified to comprise an internal chamber 50 having passages 51,52 extending from the respective ends thereof. Flow through passages 51 and 52 is controlled by one-way valves 53,54 respectively. In addition, the left hand end of the motor is fitted with a secondary cylinder 55 having an axial bore in which a reduced diameter section 56 of the piston 6 moves. The fit between the section 56 of piston 6 and the secondary cylinder is similar to that described above in relation to the main part of the piston 6 and the cylinder 4. Formed at the left hand end of the secondary cylinder 55 is a small housing 57 which defines a chamber 58 leading to an outlet orifice 59. Connecting the chamber 58 to the interior of the secondary cylinder 55 is a passage 60 controlled by a one-way valve 61. At the right hand end of the motor, the end plate is formed with a passage 62 controlled by a one-way valve 63 which leads from the exterior to the interior 49 of the cylinder 4.

The first stage of compression takes place in the interior 49 of cylinder 4; the second stage takes place in the interior 64 of cylinder 55. The interior 50 acts as a connection/ reservoir volume as between the two compression stages.

The two stage embodiments have the advantage of enabling a higher pressure ratio.

In the double-acting embodiment the two compressors act in parallel and 180 deg. out of phase. The two advantages are:

i) Twice the swept volume for the same motor diameter ii) Twice as many flow pulses giving a smoother delivery Both two-stage and double-acting embodiments have the advantage of being a more balanced load for the motor than the single compressor stage shown in FIG. 9.

Figure 15:
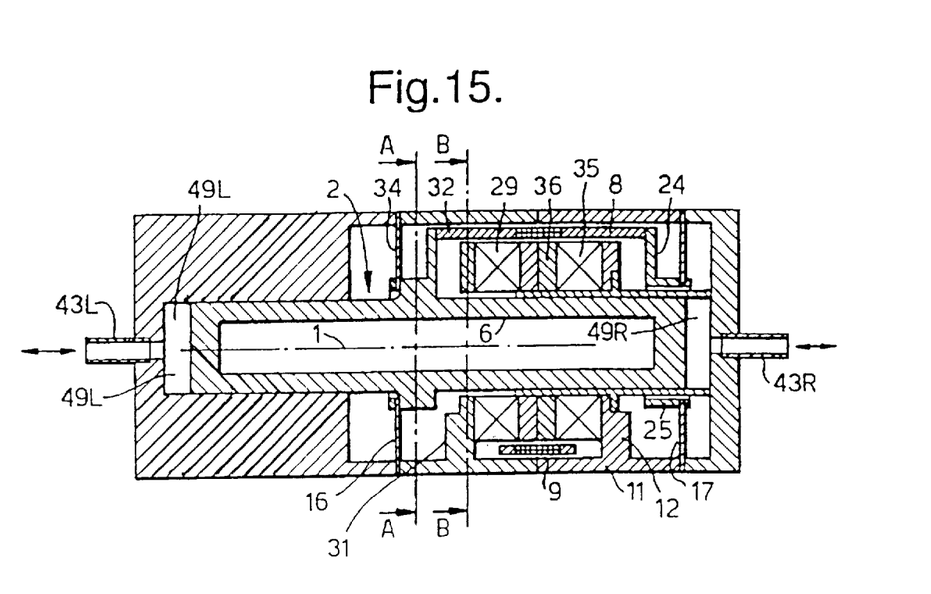
Figure 16:
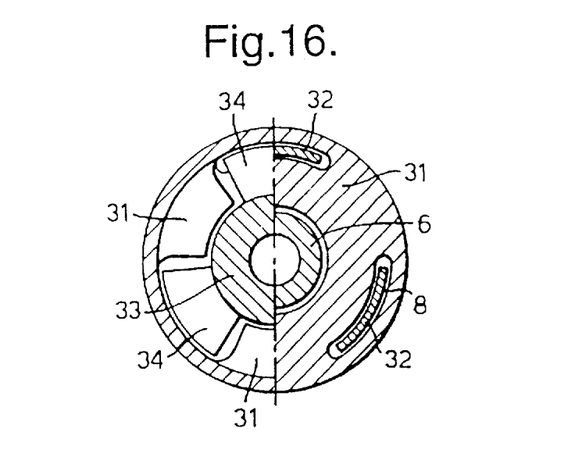

The compressor shown in FIGS. 15 and 16 is a valveless double piston arrangement which can be used in Stirling cycle machines. For convenience, FIG. 15 is labelled in the same way as in FIG. 11, where appropriate (reference 43 is used for the combined inlet/outlet port); however, it will be appreciated that, in each case, the compression space 49L and 49R forms part of a separate system—i.e. there are, in effect, two Stirling cycle machines operating with a common compressor motor.

It is to be noted that, for each of the embodiments of FIGS. 11/12, 13/14 and 15/16, the two ends of piston 6 may have the same or different diameters, according to the circumstances.

Figure 17:
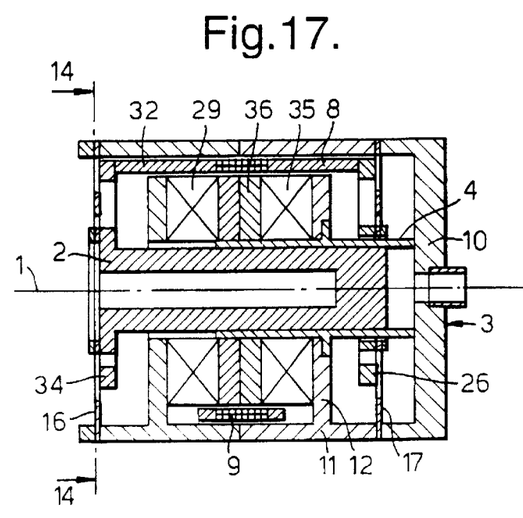
Figure 18:
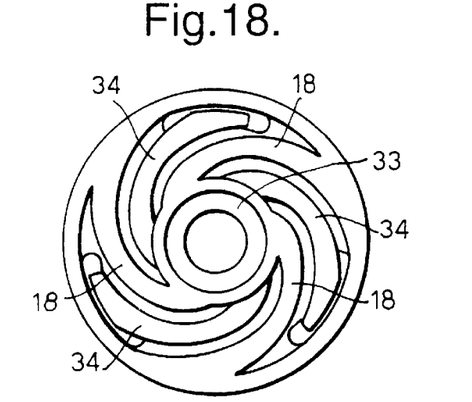
FIG. 18 is a view on the lines 18—18 of FIG. 17.
Figure 19:
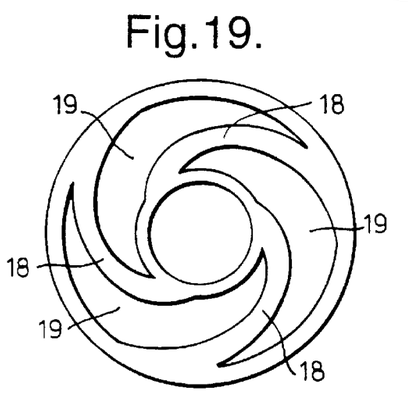
FIG. 19 is an end view of the piston assembly forming part of the embodiment of FIG. 17.
Figure 20:
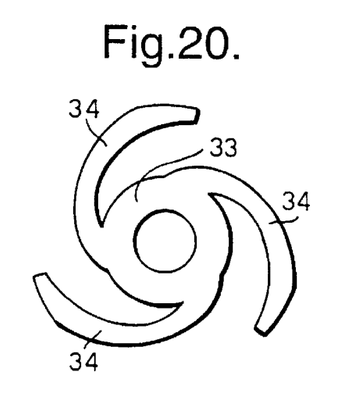
FIG. 20 is a plan view of the spring used in the embodiment of FIG. 17.

FIGS. 17 to 19 illustrate an embodiment which is similar to FIGS. 7 and 8 but in which a modified form of spiral spring is used to achieve a more compact design in the axial direction. In FIG. 17, the spider members are modified so that the three wings 26,34 take the form of respective spiral arms, as shown in FIGS. 18 and 19. At the end of each spiral arm is attached a respective castellation 23/32 of the coil holder 8, as described above. The shape of the modified spring is shown in FIG. 20 and will be seen to comprise just three spiral arms 18 separated by slots 19. The slots are specially widened to clear the spiral arms 26,34 of the spider members and this feature enables the springs 16,17 to be moved inwards, to substantially the same place as the spider members since movement of the springs, as the piston 6 oscillates backwards and forwards, will not cause the springs to foul the spiral arms 26,34.

Figure 27:
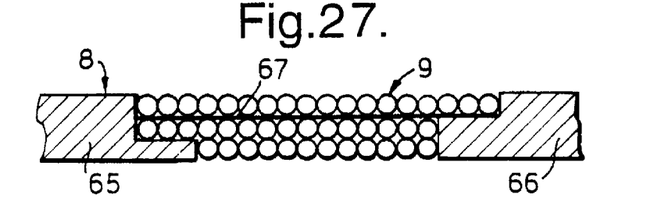
FIGS. 27, 28 and 29 are enlarged views of parts of the coil assembly of FIGS. 23 or 26, showing 3 alternative ways of winding the coil.
Figure 28:
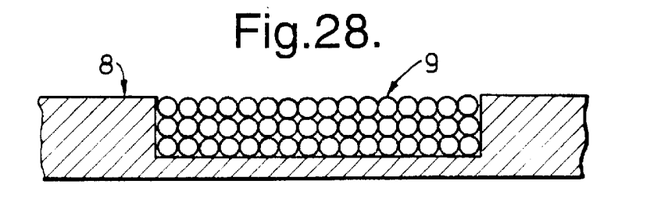
Figure 29:
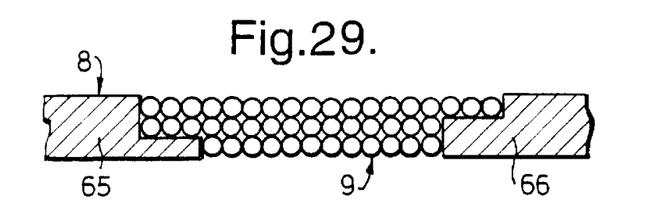

FIGS. 27 to 29 are enlarged views of that part of the coil holder 8 which carries the coil 9 itself. The simple way is shown in FIG. 28 in which a broad slot is cut in the outside surface of the holder 8 and the coil windings placed in the slot so that they do not protrude from the slot. In FIGS. 27 and 29 the coil holder is, in effect, formed in two parts 65,66 which are held together by the coil windings themselves. For this purpose the coil windings are preferably potted. The stepped formation of the facing ends of the parts 65,66 adds to the strength of the assembly. In the arrangement shown in FIG. 27, a sheet 67 of magnetic or non-magnetic reinforcing material is incorporated into the coil winding to increase strength. The sheet 67 may, for example, be of woven or non-woven fabric, or a plastics sheet. Specific examples are Kevlar or carbon fibre. One sheet is shown but more could, of course, be included, spaced between adjacent layers of the winding as needed. The reinforcing sheet should preferably be made of non-conductive material in order to eliminate eddy currents; if conductive it should be discontinuous in some way, for example, slotted.

In FIGS. 27 to 29, the coil is shown as being wound with round wire. However, use of round wire inevitably introduces voids between adjacent turns, resulting in a winding with a low fill factor. Use of rectangular section wire can improve the fill factor and hence improve the performance of the motor. One known technique is to "edgewise" wind coils with ribbon wire.

The compressor motors described herein have a number of specialist applications, particularly in refrigeration. For example, in valveless form, they can be used in Stirling cycle coolers, heat pumps and engines and pulse tube coolers; in valved form they can be used in JT (Joule Thompson) coolers, GM (Gifford McMahon) coolers or other lubricant-free applications.

The construction used means that there are virtually no relatively moving parts to cause wear. The outer surface of the piston 6 may be coated with a polymer sleeving having an appropriate differential expansion coefficient to match that of the cylinder. The cylinder 4 is made of a non-magnetic material such as aluminum which is hard-anodised on its inside surface to provide a hard wearing surface which will resist damage due to small particles getting in the clearance gap between cylinder and piston. Alternatively both piston and cylinder can be made of a hard material such as a suitable ceramic.

The use of the coil as a structural member is particularly advantageous in the twin magnetic circuit embodiments such as FIGS. 5 and 7 because it allows a very compact and rugged construction. Without it, a long coil holder would have to be cantilevered from one supporting spider and it is doubtful whether this would be mechanically satisfactory.

What is claimed is:

1. A linear compressor motor comprising a cylinder assembly and a piston assembly, mounting means for mounting said cylinder assembly to said piston assembly for limited movement along an axis, magnet means mounted on one of said assemblies, said magnet means having an air gap defined between opposite magnetic poles thereof, a coil subassembly mounted on the other of said assemblies and including a coil mounted for axial movement in said air gap, the motor being characterized in that said other of said assemblies comprises a first part and a second part joined by said coil subassembly, in that said mounting means comprises two axially-spaced connecting elements, a first element connecting said first part of said other of said assemblies to said one of said assemblies and a second element connecting said second part of said other of said assemblies to said one of said assemblies.

2. A motor as claimed in claim 1 wherein each of said assemblies comprises a coaxially-positioned cylindrical member constituting, in the cylinder assembly, a cylinder and, in the piston assembly, a piston, and wherein the electromagnetic interaction between the coil and the magnet means, when the coil is energised, causes an axial reciprocatory motion between the piston and the cylinder, to produce a pumping action.

3. A motor as claimed in claim 2 wherein the first part of said other of said assemblies carries the cylindrical member of said other of said assemblies and the second part of said other of said assemblies carries a collar which is fitted over the cylindrical member of said one of said assemblies, so as to be slidable therealong.

4. A motor as claimed in claim 3 wherein said collar is a clearance fit over said cylindrical member.

5. A motor as claimed in claim 2 wherein said magnet means comprises an annular magnet and associated polepiece attached for movement with the cylindrical member of said one of said assemblies at an axial position such as to enable an electromagnetic interaction with said coil.

6. A motor as claimed in claim 5 wherein two said annular magnets are provided, said magnets being axially separated with respect to said axis.

7. A motor as claimed in claim 6 wherein said magnets are axially separated by said polepiece which is thus common to both magnets and are axially magnetised in mutually opposite directions.

8. A motor as claimed in claim 6 wherein the or each magnet is a permanent magnet.

9. A motor as claimed in claim 6 wherein the or each magnet is an electromagnet.

10. A motor as claimed in claim 2 wherein the cylindrical member of said one of said assemblies carries a flange extending radially from the cylindrical member and supporting a generally cylindrical housing.

11. A motor as claimed in claim 10 wherein at least a part of said housing is made of magnetic material positioned so as to form part of a magnetic circuit also including the magnet means and the coil.

12. A motor as claimed in claim 10 wherein said first and second connecting elements are positioned on respective opposite sides of said flange with respect to said axis.

13. A motor as claimed in claim 12 wherein said flange is formed with through-apertures through which portions of said coil subassembly pass in such a way as to allow relative axial movement between the coil subassembly and the flange.

14. A motor as claimed in claim 13 wherein said coil subassembly is formed at one axial end by a plurality of radially spaced-apart castellations and wherein said flange is formed with correspondingly-shaped radially spaced-apart through apertures.

15. A motor as claimed in claim 1 wherein the connecting elements each comprise one or more spiral springs, each spiral comprising a flat disc of thin material in which spiral arms are cut by forming spiral slots in the disc and said two assemblies are connected to said connecting elements at opposite ends of said arms.

16. A motor as claimed in claim 15 wherein said slots in the disc extend between an outer annulus forming part of the disc and an inner annulus forming part of the disc.

17. A motor as claimed in claim 16 wherein the outer ends of said slots in the disc extend to the outer perimeter of the disc, thus separating the outer ends of the arms.

18. A motor as claimed in claim 1 wherein said coil subassembly includes a coil holder of cylindrical shape.

19. A motor as claimed in claim 18 wherein the coil is wound in a slot formed in said coil holder.

20. A motor as claimed in claim 19 wherein said slot is formed in the outer peripheral surface of said coil holder.

21. A motor as claimed in claim 18 wherein the coil holder is formed of two axially-separated parts, and wherein the coil is wound in the annular space separating the two parts, the coil being such as to constitute a self-supporting structural unit able to join together the two parts of the coil holder.

22. A motor as claimed in claim 21 wherein, for the purpose of rendering it a self-supported structural unit, the coil is potted to bind the coil turns together as a single unit.

23. A motor as claimed in claim 21 wherein thin layers of magnetic or non-magnetic material are placed between adjacent layers of the coil winding for the purpose of reinforcement.

24. A linear compressor motor comprising a cylinder assembly mounted to a piston assembly for limited movement along an axis, a magnet assembly having north and south poles pieces mounted on said piston assembly, said magnet assembly having a cylindrical air gap defined between its said north and south pole pieces, a coil mounted on said cylinder assembly for axial movement in said air gap, said cylinder assembly including a first part and a second part configured such that said coil is disposed on a connecting portion between said first and second cylinder parts, first and second axially spaced connecting elements, said first connecting element connecting said first part of said cylinder assembly to said piston assembly and said second connecting element connecting said second part of said cylinder assembly to said piston assembly.

25. A linear compressor motor according to claim 24 wherein said connecting elements are spiral springs whereby said first spring connects said first part of said cylinder assembly to said piston assembly and said second spring connects said second part of said cylinder assembly to said piston assembly and said coil is disposed between said first and second parts of said cylinder assembly.

* * * * *